United States Patent
Maeda (10) Patent No.: US 10,661,635 B2
(45) Date of Patent: May 26, 2020

(54) VEHICLE AIR-CONDITIONING UNIT

(71) Applicant: DENSO CORPORATION, Kariya, Aichi-pref. (JP)

(72) Inventor: Kenichiro Maeda, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 295 days.

(21) Appl. No.: 15/567,399

(22) PCT Filed: Mar. 17, 2016

(86) PCT No.: PCT/JP2016/058594
§ 371 (c)(1),
(2) Date: Oct. 18, 2017

(87) PCT Pub. No.: WO2016/170878
PCT Pub. Date: Oct. 27, 2016

(65) Prior Publication Data
US 2018/0093551 A1 Apr. 5, 2018

(30) Foreign Application Priority Data
Apr. 24, 2015 (JP) ................ 2015-089527

(51) Int. Cl.
*F24F 7/00* (2006.01)
*B60H 1/32* (2006.01)
*B60H 1/00* (2006.01)

(52) U.S. Cl.
CPC ....... *B60H 1/3233* (2013.01); *B60H 1/00064* (2013.01); *B60H 1/00849* (2013.01); *B60H 1/3227* (2013.01); *B60H 2001/00135* (2013.01)

(58) Field of Classification Search
CPC .............. B60H 1/3233; B60H 1/00064; B60H 1/00849; B60H 1/3227; B60H 2001/00135
(Continued)

(56) References Cited

U.S. PATENT DOCUMENTS 4,482,009 A * 11/1984 Nishimura ......... B60H 1/00842
165/203
4,604,873 A * 8/1986 Ohashi ................ B60H 1/0005
62/158
(Continued)

FOREIGN PATENT DOCUMENTS

EP 1457366 A1 9/2004
JP H07172152 A 7/1995
(Continued)

*Primary Examiner* — Claire E Rojohn, III
(74) *Attorney, Agent, or Firm* — Harness, Dickey & Pierce, P.L.C.

(57) ABSTRACT

A vehicle air-conditioning unit includes an air-conditioning case and an inside/outside air switching door that is configured to change a ratio of a flow rate of an inside air to a flow rate of an outside air in an air introduced into the air-conditioning case. The vehicle air-conditioning unit includes a cooler that is disposed in the air-conditioning case, and a blower that is located downstream of the cooler and sends the air to a vehicle compartment. The air-conditioning case includes a drain pipe located downstream of the cooler, the drain pipe having a tube shape through which a condensed water generated on the cooler is drained out of the air-conditioning case. The cooler is located on an extended line of a centerline of the drain pipe such that a suction air drawn through the drain pipe into the air-conditioning case flows along the cooler.

12 Claims, 5 Drawing Sheets

(58) Field of Classification Search
USPC .......................................................... 165/59
See application file for complete search history.

(56) References Cited

U.S. PATENT DOCUMENTS

| | | | | |
|---|---|---|---|---|
| 5,181,553 | A * | 1/1993 | Doi .................... | B60H 1/00842 165/203 |
| 5,337,802 | A * | 8/1994 | Kajino ................. | B60H 1/0075 165/203 |
| 5,481,886 | A * | 1/1996 | Hasegawa ............... | F24F 13/22 165/913 |
| 5,511,939 | A * | 4/1996 | Tokunaga .......... | B60H 1/00471 415/119 |
| 6,142,864 | A * | 11/2000 | Uemura ............. | B60H 1/00064 454/121 |
| 6,206,092 | B1 * | 3/2001 | Beck ................. | B60H 1/00064 165/203 |
| 6,293,339 | B1 * | 9/2001 | Uemura ............. | B60H 1/00064 165/103 |
| 6,431,257 | B1 * | 8/2002 | Sano .................. | B60H 1/00064 165/202 |
| 6,478,083 | B1 * | 11/2002 | Nanba ................ | B60H 1/00514 165/202 |
| 6,575,701 | B2 * | 6/2003 | Kamiya ............. | B60H 1/00471 415/206 |
| 6,607,029 | B2 * | 8/2003 | Danieau ............. | B60H 1/00021 165/203 |
| 6,761,210 | B1 * | 7/2004 | Arold ................. | B60H 1/00064 165/203 |
| 6,886,350 | B2 * | 5/2005 | Petesch .............. | B60H 1/00064 165/42 |
| 6,959,754 | B2 * | 11/2005 | Lee .................... | B60H 1/00064 165/202 |
| 6,994,157 | B1 * | 2/2006 | Arold ................. | B60H 1/00064 165/203 |
| 8,240,164 | B2 * | 8/2012 | Tokunaga .......... | B60H 1/00028 165/61 |
| 8,382,563 | B2 * | 2/2013 | Sievers .............. | B60H 1/00007 454/126 |
| 8,397,795 | B2 * | 3/2013 | Seto ................... | B60H 1/00328 165/153 |
| 8,443,873 | B2 * | 5/2013 | Nanaumi ............. | B60H 1/0005 165/202 |
| 9,188,357 | B2 * | 11/2015 | Hirai ................. | B60H 1/00742 |
| 9,821,627 | B2 * | 11/2017 | Della Rovere .... | B60H 1/00921 |
| 10,144,265 | B2 * | 12/2018 | Kuwayama ........ | B60H 1/00064 |
| 10,369,862 | B2 * | 8/2019 | Yamaoka ........... | F24F 1/0018 |
| 2001/0025501 | A1 * | 10/2001 | Schmadl ............ | B60H 1/00064 62/239 |
| 2001/0025502 | A1 * | 10/2001 | Klingler ............. | B60H 1/00064 62/239 |
| 2003/0056531 | A1 * | 3/2003 | Nishida ............. | B60H 1/00064 62/244 |
| 2004/0200611 | A1 * | 10/2004 | Tamatsu ............. | B60H 1/00007 165/203 |
| 2006/0005959 | A1 * | 1/2006 | Maeda ............... | B60H 1/00328 165/202 |
| 2006/0053815 | A1 * | 3/2006 | Naruse ............... | B60H 1/00828 62/244 |
| 2006/0053818 | A1 * | 3/2006 | Yoshida ................ | F28F 17/005 62/285 |
| 2006/0065388 | A1 * | 3/2006 | Newman ............ | B60H 1/00028 165/202 |
| 2006/0242984 | A1 * | 11/2006 | Kang ................. | B60H 1/00514 62/285 |
| 2009/0025905 | A1 | 1/2009 | Tokunaga et al. | |
| 2009/0032216 | A1 * | 2/2009 | Kim ................... | B60H 1/00064 165/63 |
| 2010/0212347 | A1 * | 8/2010 | Kim ................... | B60H 1/3233 62/285 |
| 2010/0273411 | A1 * | 10/2010 | Kakizaki ............ | B60H 1/00064 454/159 |
| 2011/0005707 | A1 * | 1/2011 | Seto ................... | B60H 1/00064 165/41 |
| 2011/0005708 | A1 * | 1/2011 | Seto ................... | B60H 1/00064 165/41 |
| 2011/0005709 | A1 * | 1/2011 | Kitamura ........... | B60H 1/00064 165/61 |
| 2011/0005711 | A1 * | 1/2011 | Seto ................... | B60H 1/00064 165/61 |
| 2011/0005714 | A1 * | 1/2011 | Katsuki ............. | B60H 1/00028 165/61 |
| 2011/0005717 | A1 * | 1/2011 | Nanaumi ........... | B60H 1/00064 165/61 |
| 2011/0005718 | A1 * | 1/2011 | Seto ................... | B60H 1/00064 165/61 |
| 2011/0005719 | A1 * | 1/2011 | Seto ................... | B60H 1/00064 165/61 |
| 2011/0005720 | A1 * | 1/2011 | Seto ................... | B60H 1/00064 165/71 |
| 2015/0027145 | A1 * | 1/2015 | Kanemaru ........... | F25D 21/125 62/82 |
| 2016/0001637 | A1 * | 1/2016 | Kume ................. | F24F 13/222 62/285 |
| 2017/0096050 | A1 * | 4/2017 | Sekito ............... | B60H 1/00064 |
| 2018/0022188 | A1 * | 1/2018 | Kakizaki ............ | B60H 1/3204 165/202 |
| 2018/0029447 | A1 * | 2/2018 | Kato ................. | B60H 1/00021 |
| 2019/0047351 | A1 * | 2/2019 | Shimoyama ......... | B60H 1/0055 |

FOREIGN PATENT DOCUMENTS

| | | |
|---|---|---|
| JP | 2522806 Y2 | 1/1997 |
| JP | 2000062436 A | 2/2000 |
| JP | 2004184034 A | 7/2004 |
| JP | 2004276707 A | 10/2004 |
| JP | 2006021596 A | 1/2006 |
| JP | 2009023590 A | 2/2009 |
| JP | 2009126217 A | 6/2009 |

* cited by examiner

VEHICLE AIR-CONDITIONING UNIT

CROSS REFERENCE TO RELATED APPLICATIONS

This application is a U.S. National Phase Application under 35 U.S.C. 371 of International Application No. PCT/JP2016/058594 filed on Mar. 17, 2016 and published in Japanese as WO 2016/170878 A1 on Oct. 27, 2016. This application is based on and claims the benefit of priority from Japanese Patent Application No. 2015-089527 filed on Apr. 24, 2015. The entire disclosures of all of the above applications are incorporated herein by reference.

TECHNICAL FIELD

The present disclosure relates to a vehicle air-conditioning unit that blows conditioning air into a vehicle compartment.

BACKGROUND ART

Conventionally, air-mix type vehicle air conditioners are known, in which the temperature of air to be blown into a vehicle compartment is adjusted by regulating a mixing ratio of cool air cooled by an evaporator that is a cooling heat exchanger to warm air heated by a heater core that is a heating heat exchanger.

Among such vehicle air conditioners, there is a so-called suction-type layout vehicle air conditioner that is equipped with a blower positioned on an air-flow downstream side of the evaporator to blow air into the vehicle compartment (for example, see Patent Document 1).

PRIOR ART DOCUMENT

Patent Document

Patent Document 1: JP 2009-23590 A

SUMMARY OF THE INVENTION

In the above-described suction-type vehicle air conditioner, when the blower starts its operation, the outside air, which is located outside a vehicle compartment, is drawn into an air-conditioning case via a drain hole, through which a condensed water generated on the evaporator is drained, by a blowing pressure of the blower. Since the vehicle air conditioner has the drain hole provided on the air-flow downstream side of the evaporator, the suction air drawn from the outside of the vehicle compartment into the air-conditioning case via the drain hole is blown into the vehicle compartment without being cooled through heat exchange in the evaporator.

Thus, for example, when the outside air temperature is high, air that does not exchange heat in the evaporator is blown into the vehicle compartment, and accordingly an occupant may feel uncomfortable because of the reduced cooling capacity.

In the above-described vehicle air conditioner, even in an inside-air operation mode, the outside air is drawn into the air-conditioning case through the drain hole, and then the suction air drawn into the air-conditioning case is blown into the vehicle compartment as it is. Thus, when the outside air contains a bad smell, smoke, or the like, the air with a bad smell, smoke, or the like is drawn into the air-conditioning case via the drain hole, and the occupant may feel uncomfortable due to the bad smell, smoke, or the like.

In consideration of the above-described points, it is an objective of the present disclosure to reduce uncomfortable feelings of occupants due to a bad smell, smoke or the like contained in a suction air with suppressing a decrease of a cooling capacity due to the suction air.

To achieve the above-described objective, a vehicle air-conditioning unit according to an aspect of the present disclosure has the following configurations. The vehicle air-conditioning unit includes: an air-conditioning case that is provided in the vehicle; an inside/outside air switching door that is configured to change a ratio of a flow rate of an inside air to a flow rate of an outside air in an air introduced into the air-conditioning case; a cooler that is disposed in the air-conditioning case and cools the air flowing through the air-conditioning case. The vehicle air-conditioning unit includes a blower that is located downstream of the cooler with respect to a flow of the air and sends the air to a vehicle compartment, and the air-conditioning case includes a drain pipe located downstream of the cooler with respect to the flow of the air, the drain pipe having a tube shape through which a condensed water generated on the cooler is drained out of the air-conditioning case. The cooler is located on an extended line of a centerline of the drain pipe such that a suction air drawn through the drain pipe into the air-conditioning case flows along the cooler.

According to such configurations, the air-conditioning case includes the drain pipe located downstream of the cooler, the drain pipe having a tube shape through which the condensed water generated on the cooler is drained out of the air-conditioning case, and the cooler is located on the extended line of the centerline of the drain pipe. Moreover, in the air-conditioning case, the suction air drawn into the air-conditioning case through which the drain pipe flows along the cooler. Accordingly, the air-conditioning case having such configurations is capable of cooling the suction air drawn into the air-conditioning case by the cooler and limiting a decrease of a cooling capacity due to the suction air. Moreover, even when the suction air contains a bad smell, smoke or the like, the condensed water generated on the cooler reduces the bad smell, smoke or the like, and accordingly uncomfortable feelings of occupants due to the bad smell, smoke or the like in the suction air can be reduced.

EMBODIMENTS FOR EXPLOITATION OF THE INVENTION

Hereinafter, embodiments of the present disclosure will be described referring to drawings. Note that in the respective embodiments below, the same or equivalent parts are indicated by the same reference characters throughout the figures.

First Embodiment

Figure 1:
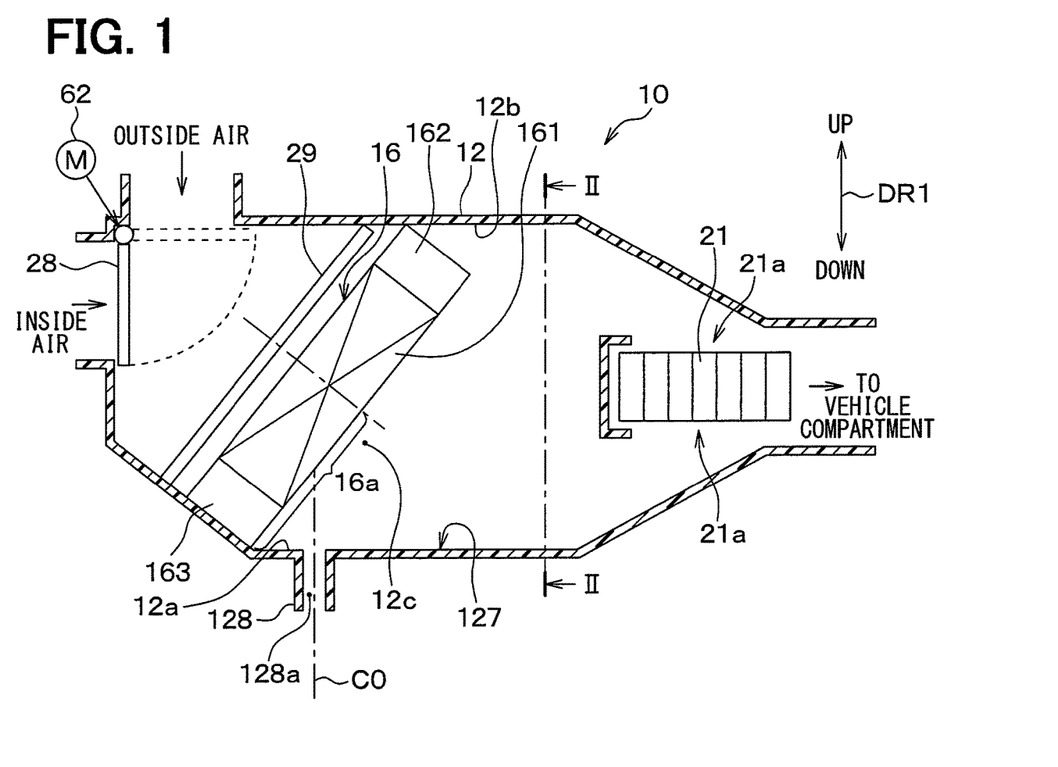
FIG. 1 is a diagram illustrating a main structure of a vehicle air-conditioning unit according to a first embodiment of the present disclosure.

A vehicle air-conditioning unit 10 according to a first embodiment of the present disclosure will be described with reference to FIGS. 1 and 2. FIG. 1 is a cross-sectional view showing the main structure of the vehicle air-conditioning unit 10 of this embodiment. In FIG. 1, respective up and down arrows DR1 indicate the directions in a vehicle-mounted state where the vehicle air-conditioning unit 10 is mounted in a vehicle. That is, both end-arrows DR1 shown in FIG. 1 denote the up and down directions of the vehicle.

The vehicle air-conditioning unit 10 shown in FIG. 1 configures parts of a vehicle air conditioner, including a compressor and a condenser that are disposed in an engine room of the vehicle. The vehicle air-conditioning unit 10 is disposed inside a dashboard, i.e. inside an instrument panel at the foremost portion of the vehicle compartment.

As shown in FIG. 1, the vehicle air-conditioning unit 10 includes an air-conditioning case 12, an evaporator 16, an inside/outside air switching door 28, a dust-proof filter 29, and a blower 21, for example. The vehicle air-conditioning unit 10 in this embodiment has a suction-type layout in which the blower 21 is disposed downstream of the evaporator 16 with respect to a flow of air.

The air-conditioning case 12 is a resin member that forms an outer shell of the vehicle air-conditioning unit 10 and has a substantially cuboid shape. FIG. 1 shows main parts of the entire air-conditioning case 12.

The inside/outside air switching door 28 changing a ratio of an outside air that is air outside the vehicle compartment to an inside air that is air inside the vehicle compartment is provided in the air-conditioning case 12. The inside/outside air switching door 28 is driven by an electric actuator 62, and an actuation of the electric actuator 62 is controlled by a control signal outputted from an air-conditioning control unit (not shown).

The outside air that is the air outside the vehicle compartment or the inside air that is the air in the vehicle compartment is introduced into the air-conditioning case 12 by the blower 21. The outside air or the inside air introduced into the air-conditioning case 12 flows into the evaporator 16 through the dust-proof filter 29.

The evaporator 16 is a cooling heat exchanger or a cooler that cools the air flowing through the air-conditioning case 12. The evaporator 16 is accommodated in the air-conditioning case 12 and disposed to receive the inflow of the outside air or the inside air introduced into the air-conditioning case 12. The evaporator 16 configures a known refrigeration cycle device for circulation of a refrigerant together with a compressor, a condenser, and an expansion valve which are not shown. The evaporator 16 cools the air passing through the evaporator 16 by an evaporation of the refrigerant.

The structure of the evaporator 16 is the same as that of a known evaporator commonly used in a vehicle air conditioner. Specifically, the evaporator 16 includes a core portion 161 that cools the air flowing through the air-conditioning case 12 by heat exchange, a first header tank portion 162 disposed at an upper end of the core portion 161, and a second header tank portion 163 disposed at a lower end of the core portion 161. The second header tank portion 163 corresponds to a lower header tank portion. The core portion 161, the first header tank portion 162, and the second header tank portion 163 are formed of metal with high thermal conductivity, such as aluminum. The core portion 161 of the evaporator 16 includes multiple refrigerant tubes, each communicating with the header tank portions 162 and 163 and having a flat cross-sectional shape, and multiple corrugated fins formed in a wave shape and disposed between the adjacent refrigerant tubes. Furthermore, the core portion 161 has a structure in which the refrigerant tubes and the corrugated fins are alternately stacked in the vehicle front-rear direction.

The evaporator 16 of the present embodiment is inclined such that the air passing through the core portion 161 flows obliquely downward. Specifically, the evaporator 16 is obliquely disposed such that the upper end of the evaporator 16 is located downstream of the lower end with respect to the flow of the air.

The evaporator 16 exchanges heat between a low-temperature refrigerant flowing through the refrigerant tubes and the air passing through the core portion 161, thereby the air is cooled. The core portion 161 is partitioned into multiple fine air passages by the refrigerant tubes and the corrugated fins, so that in the core portion 161, the air mainly flows along the thickness direction of the core portion 161.

The blower 21 is provided in the air-conditioning case 12. The blower 21 is a centrifugal blower that blows the air introduced into the air-conditioning case 12. The blower 21 includes two air suction ports 21a through which the air is drawn, and the air is drawn through the air suction ports 21a. The air cooled or conditioned by the evaporator 16 is sent to the vehicle compartment by the blower 21.

A drain pipe 128 having a drain hole 128a through which a condensed water generated on the evaporator 16 is drained out of the vehicle is provided in a bottom surface 127 of the air-conditioning case 12. The drain pipe 128 is provided in a part of the bottom surface 127 of the air-conditioning case 12 located downstream of the evaporator 16 with respect to the flow of the air and has a pipe shape substantially perpendicular to the bottom surface 127. That is, the drain pipe 128 is a drain passage portion through which the condensed water generated on the evaporator 16.

Figure 2:
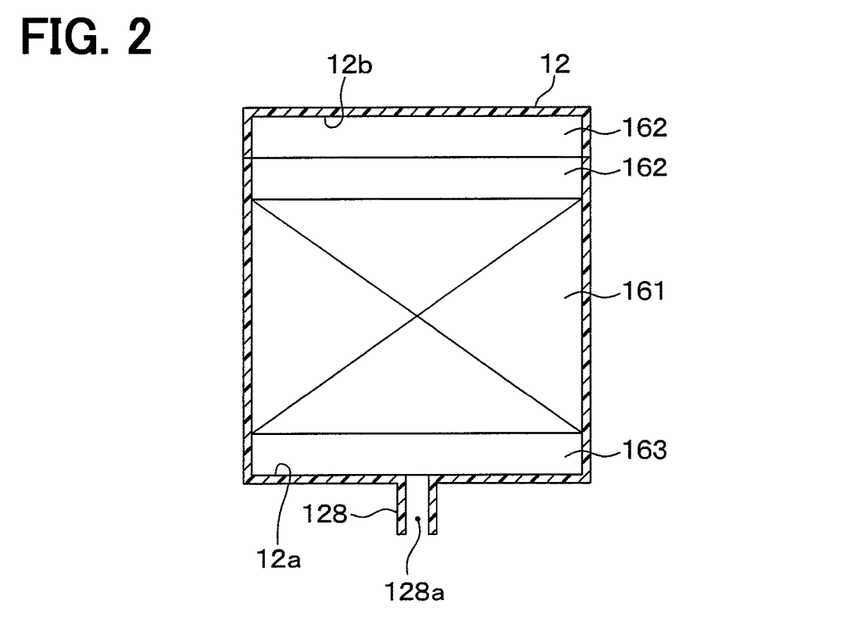
FIG. 2 is a diagram illustrating an air outflow surface side of a core portion of an evaporator of the vehicle air-conditioning unit according to the first embodiment of the present disclosure.

In the present embodiment, the drain pipe 128 provided in the bottom surface 127 of the air-conditioning case 12 is located at a center in a left-right direction of the evaporator 16 when the evaporator 16 is viewed from an air outflow surface of the core portion 161 of the evaporator 16, as shown in FIG. 2. The left-right direction of the evaporator 16 is a lengthwise direction of a lower end portion of the evaporator 16, i.e. left-right direction of the sheet of FIG. 2.

The condensed water generated on the evaporator 16 drops to the bottom surface 127 of the air-conditioning case 12, and then the condensed water is drained out of the air-conditioning case 12 through the drain pipe 128. When an operation of the blower 21 is started, the pressure in the air-conditioning case 12 decreases, and accordingly the outside air of the vehicle compartment is drawn into the air-conditioning case 12 through the drain pipe 128. For example, in summer, high-temperature outside air is drawn into the air-conditioning case 12 through the drain hole 128a of the drain pipe 128. The suction air drawn into the air-conditioning case 12 is sent to the vehicle compartment by the blower 21.

In the vehicle air-conditioning unit 10, the suction air drawn into the air-conditioning case 12 through the drain hole 128a of the drain pipe 128 exchanges heat with the air flowing out of the evaporator 16 to be cooled. Specifically, the evaporator 16 is located on an extended line of a centerline C0 of the drain pipe 128, such that the suction air drawn into the air-conditioning case 12 through the drain pipe 128 flows along the evaporator 16. In the present embodiment, the evaporator 16 is located such that a half part 16a of the evaporator 16 close to a bottom surface 127 is located on the extended line of the centerline C0 of the discharge port. A point at which the extended line of the centerline C0 of the drain pipe 128 intersects with the evaporator 16 is located downward of an air suction port 21a of the blower 21.

Figure 3:
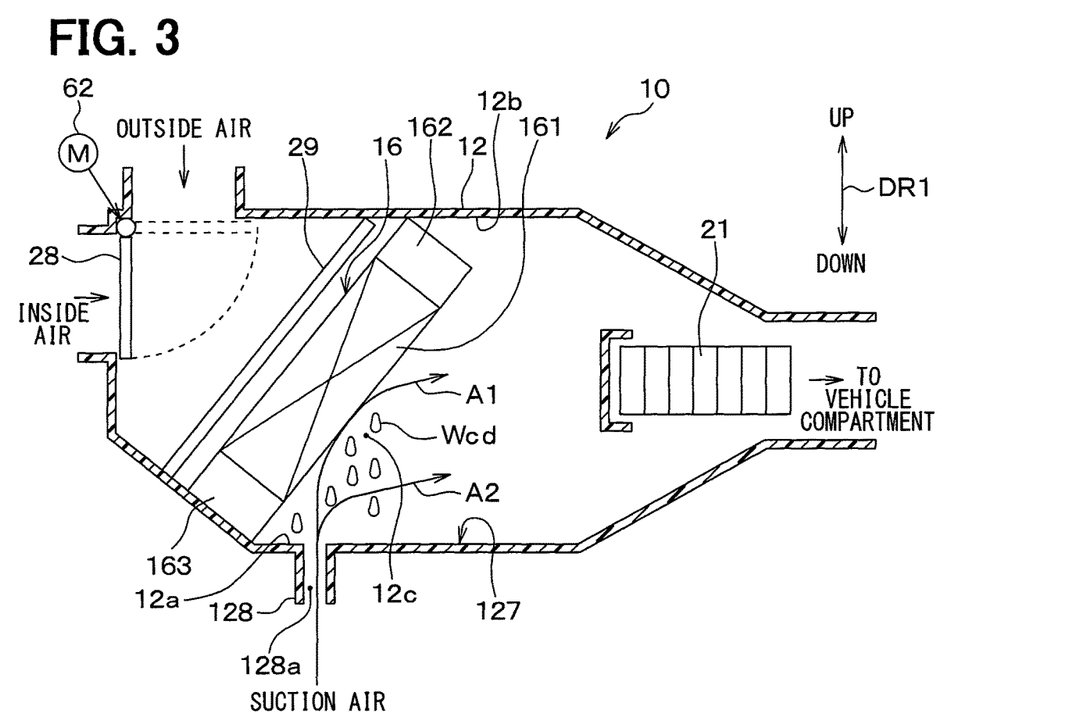
FIG. 3 is a diagram for explaining a flow of a suction air drawn into an air-conditioning case through a drain pipe.

Accordingly, a large part of the suction air drawn into the air-conditioning case 12 through the drain hole 128a flows along the evaporator 16 as indicated by an arrow A1 in FIG. 3 and exchanges heat with the air passing through the evaporator 16 to be cooled. Subsequently, the suction air is drawn into the blower 21 to be sent to the vehicle compartment by the blower 21. That is, when the large part of the suction air drawn into the air-conditioning case 12 through the drain hole 128a reaches the air outflow surface of the evaporator 16, the suction air is pushed by the air flowing out of the evaporator 16. The suction air is drawn into the blower 21 after flowing along the evaporator 16.

In the present embodiment, the suction air reaches the lower half part 16a of the evaporator 16 close to the drain hole 128a. In the present embodiment, the heat exchange between the suction air and the air flowing out of the evaporator 16 can be enhanced compared to a case where the suction air reaches an upper half part of the evaporator 16 that is farther from the drain hole 128a, and accordingly the capacity for cooling the suction air can be improved.

In the present embodiment, as shown in FIG. 3, an air flow space 12c, in which the suction air drawn into the air-conditioning case 12 through the drain hole 128a of the drain pipe 128 flows along the evaporator 16, is provided inside the air-conditioning case 12. Specifically, the air flow space 12c is communicated with the drain hole 128a of the drain pipe 128. The air flow space 12c is a space in which the air flowing along the evaporator 16 from one side 12a of an inner part of the air-conditioning case 12 located around the drain pipe 128 to the other side 12b facing to the one side 12a across the evaporator 16. In other words, the air flow space 12c extends along the evaporator 16 from the one side 12a of the inner part of the air-conditioning case 12 located around the drain pipe 128 to the other side 12b. In this embodiment, the air flow space 12c is a space in the air-conditioning case 12 extending along the evaporator 16 from a lower side of the air-conditioning case 12 to an upper side of the air-conditioning case 12. As described above, in the present embodiment, the above-described air flow space 12c is provided in a space below the evaporator 16, i.e. a space close to the drain pipe 128, without any other component or wall partitioning the space. That is, in the present embodiment, an inside of the air-conditioning case 12 does not have multiple layers partitioned by a partitioning wall such as a first partitioning wall as in a seventh embodiment described later, but have a single-layer structure without such partitioning wall. In the present embodiment, the one side 12a of the air-conditioning case 12 is a part of the bottom surface 127 of the air-conditioning case 12.

Accordingly, in the present embodiment, the suction air drawn into the air-conditioning case 12 through the drain hole 128a of the drain pipe 128 easily flows along the evaporator 16 without being intercepted. In the present embodiment, the heat exchange between the suction air and the air flowing out of the evaporator 16 can be enhanced, and the capacity for cooling the suction air can be improved.

It is required that the air flow space 12c extends at least from the one side 12a of the air-conditioning case 12 to the other side 12b along the evaporator 16, but it is not necessarily required that the suction air flows from the one side 12a to the other side 12b.

A part of the suction air drawn into the air-conditioning case 12 through the drain hole 128a is cooled by a heat exchange with the condensed water Wcd generated on the evaporator 16, and subsequently the suction air is sent to the vehicle compartment by the blower 21.

As described above, the suction air drawn into the air-conditioning case 12 through the drain hole 128a is cooled by the heat exchange with the condensed water Wcd generated on the evaporator 16 as well as being cooled by the heat exchange with the evaporator 16.

The condensed water Wcd generated on the evaporator 16 has an effect of absorbing a bad smell, smoke or the like that may be contained in the air. For example, when the suction air drawn into the air-conditioning case 12 through the drain hole 128a contains a bad smell, smoke or the like, the bad smell, smoke or the like contacts the condensed water Wcd to be removed by the condensed water Wcd, and accordingly the air in which the bad smell, smoke or the like is reduced is sent to the vehicle compartment.

According to the above-described configurations, the vehicle air-conditioning unit 10 includes the air-conditioning case 12 mounted in the vehicle, and the inside/outside air switching door 28 that changes the ratio of the outside air to the inside air introduced into the air-conditioning case 12. The vehicle air-conditioning unit 10 includes the evaporator 16 that disposed in the air-conditioning case 12 to cool the air flowing through the air-conditioning case 12, and the blower 21 that is located downstream of the evaporator 16 with respect to the flow of the air and sends the air to the vehicle compartment.

The air-conditioning case 12 includes the drain pipe 128 located downstream of the evaporator 16 with respect to the flow of the air, and the condensed water Wcd generated on the evaporator 16 is drained through the drain pipe 128 to the outside of the air-conditioning case 12. The evaporator 16 is located on the extended line of the centerline of the drain pipe 128, such that the suction air drawn into the air-conditioning case 12 through the drain pipe 128 flows along the evaporator 16. Accordingly, in the present embodiment, the suction air drawn into the air-conditioning case 12 can be cooled by the evaporator 16, and a decrease of the cooling capacity due to the suction air can be suppressed. Moreover, even when the suction air contains a bad smell, smoke or the like, the bad smell, smoke or the like are reduced by the condensed water generated on the evaporator 16, and accordingly uncomfortable feelings of occupants due to the bad smell, smoke or the like can be reduced.

The evaporator 16 is preferably positioned such that the extended line of the centerline intersects with the half part 16a of the evaporator 16 close to the bottom surface 127 of the air-conditioning case 12.

Since the evaporator 16 is inclined such that the upper end is located on the downstream of the lower end with respect to the flow of the air passing through the evaporator 16, the condensed water generated on the evaporator 16 can be quickly drained out of the evaporator 16.

It may be considered that the suction-type layout vehicle air-conditioning unit is configured such that the suction air drawn into the air-conditioning case 12 through the drain pipe 128 passes through the evaporator 16. For example, it may be considered that the suction-type layout vehicle air-conditioning unit is configured to have a communication passage, through which the condensed water is sent from the downstream side of the evaporator 16 to the upstream side, between a surface of the evaporator 16 on a lower side of the vehicle and the bottom surface 127 of the air-conditioning case 12. However, the structure may be complicated because such configuration requires the communication passage through which the condensed water is sent from the downstream side of the evaporator 16 to the upstream side. Moreover, since the inside/outside switching door 28 and the dust-proof filter 29 are provided on the upstream side of the evaporator 16, the layout may be limited if the drain pipe 128 through which the condensed water is drained is provided on the upstream side of the evaporator 16. In contrast, the vehicle air-conditioning unit of the present disclosure does not require the communication passage through which the condensed water passes. Moreover, the vehicle air-conditioning unit of the present disclosure is capable of reducing uncomfortable feelings of occupants due to a bad smell, smoke or the like contained in the suction air with suppressing a decrease of a cooling capacity due to the suction air, without the limitation of the layout of the inside/outside air switching door 28 and the dust-proof filter 29.

Especially, in the present embodiment, the air-conditioning case 12 defines the air flow space 12c in which the suction air drawn into the air-conditioning case 12 through the drain hole 128a of the drain pipe 128 flows along the evaporator 16. Specifically, the air flow space 12c communicates with the drain hole 128a of the drain pipe 128. The air flow space 12c is a space in which the suction air flows along the evaporator 16 in the air-conditioning case 12 from the one side 12a to the other side 12b. The one side 12a is an inside part of the air-conditioning case 12 around the discharge port 128. The evaporator 16 is between the other side 12b and the one side 12a.

Accordingly, in the present embodiment, the suction air drawn into the air-conditioning case 12 through the drain hole 128a of the drain pipe 128 easily flows along the evaporator 16 without being intercepted. According to the present embodiment, the heat exchange between the suction air and the air flowing out of the evaporator 16 can be enhanced to improve the capacity for cooling the suction air.

Second Embodiment

Figure 4:
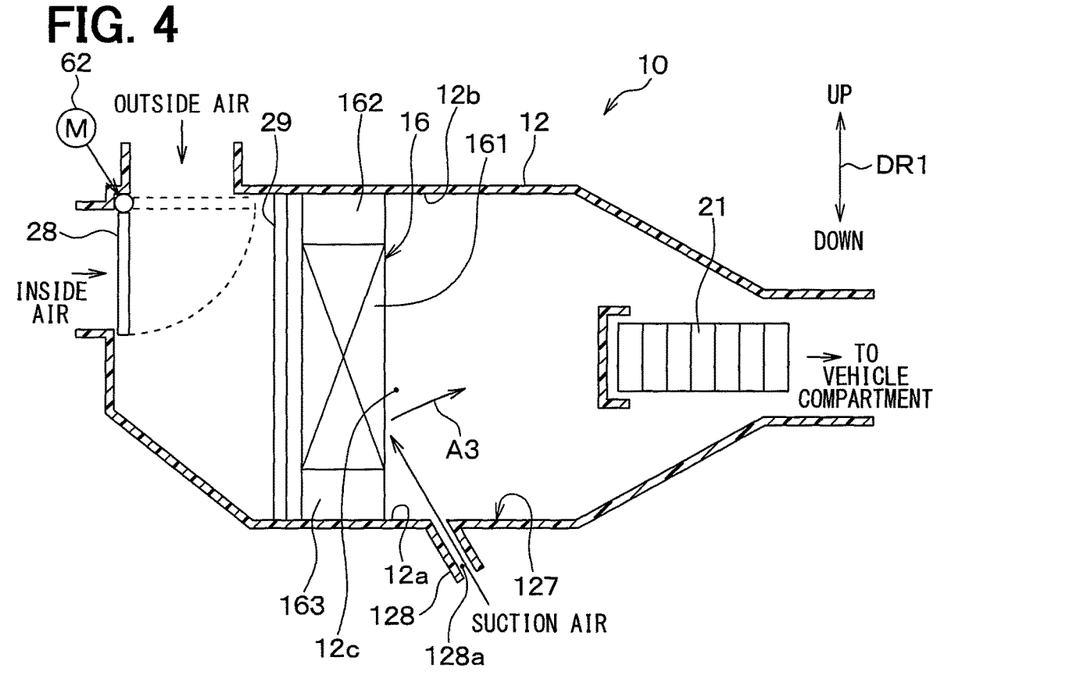
FIG. 4 is a diagram illustrating a main structure of a vehicle air-conditioning unit according to a second embodiment of the present disclosure.

A vehicle air-conditioning unit 10 according to a second embodiment of the present disclosure will be described referring to FIG. 4. In the vehicle air-conditioning unit 10 of the above-described first embodiment, the evaporator 16 is inclined with respect to the bottom surface 127 of the air-conditioning case 12, and the drain pipe 128 is provided to be perpendicular to the bottom surface 127 of the air-conditioning case 12. In contrast, the vehicle air-conditioning unit 10 of the present embodiment is different from the first embodiment, that is, the evaporator 16 is provided perpendicularly to the bottom surface 127, and the drain pipe 128 is inclined with respect to the bottom surface 127 of the air-conditioning case 12.

In the present embodiment, an end portion of the evaporator 16 located on an upper side with respect to the vehicle is directly above an end portion located on a lower side with respect to the vehicle. The evaporator 16 is provided such that an air outflow surface from which an air passing through a core portion 161 flows out is parallel to an up-down direction DR1 of the vehicle.

The drain pipe 128 is formed such that the evaporator 16 is located on an extended line of a centerline of the drain pipe 128. Specifically, the drain pipe 128 is formed such that the extended line of the centerline of the drain pipe 128 intersects with a half part of the evaporator 16 close to the bottom surface 127 of the air-conditioning case 12. The drain pipe 128 is provided such that the centerline of the drain pipe 128 is angled with respect to the bottom surface 127 of the air-conditioning case 12.

As described above, the upper end portion of the evaporator 16 is above the lower end portion, and the drain pipe 128 is provided such that the evaporator 16 is located on the extended line of the centerline of the drain pipe 128.

In such configuration, the suction air drawn into the air-conditioning case 12 through the drain pipe 128 flows along the evaporator 16 to exchange heat with the evaporator 16 and is sent to the vehicle compartment by the blower 21, as indicated by an arrow A3.

As described above, the evaporator 16 is arranged such that the upper end portion is directly above the lower end portion, and the drain pipe 128 can be provided to be angled with respect to the bottom surface 127 of the air-conditioning case 12.

Since the end portion of the evaporator 16 located on the upper side of the vehicle is directly above the end portion located on the lower side with respect to the vehicle, a dimension of the air-conditioning case 12 provided for the width of the core portion 161 of the evaporator 16 can be decreased.

In the present embodiment, the effects derived from the configurations common to the first embodiment can be obtained similarly to the first embodiment.

Third Embodiment

Figure 5:
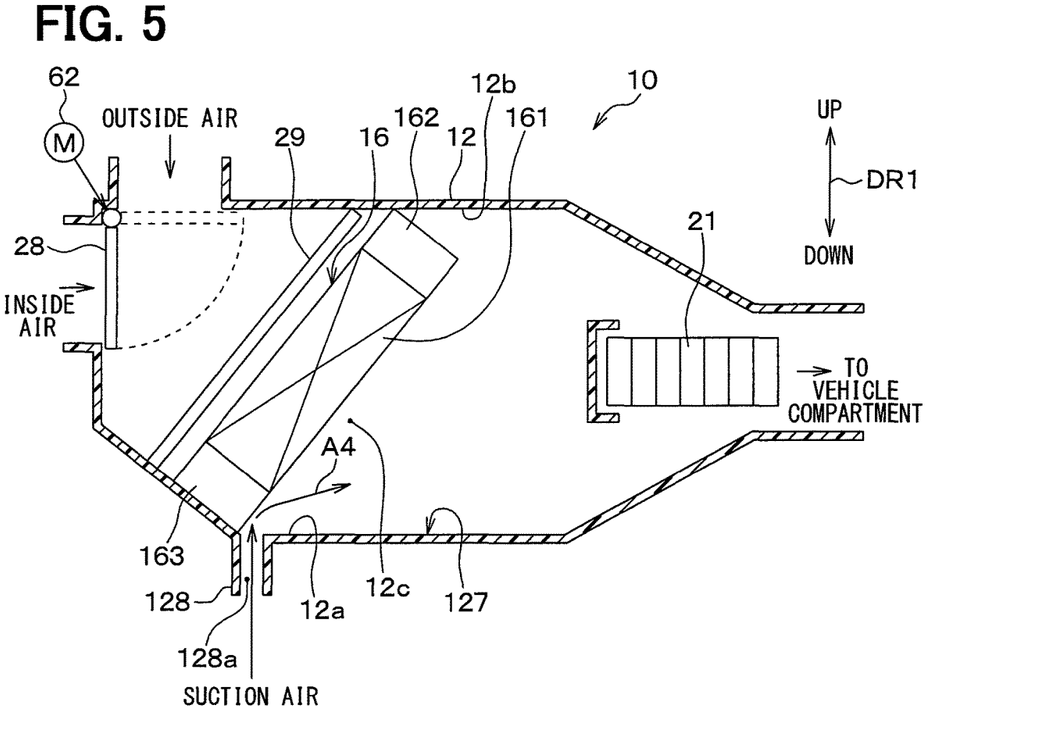
FIG. 5 is a diagram illustrating a main structure of a vehicle air-conditioning unit according to a third embodiment of the present disclosure.

A vehicle air-conditioning unit 10 according to a third embodiment of the present disclosure will be described referring to FIG. 5. The vehicle air-conditioning unit 10 of the above-described first embodiment is provided such that the suction air drawn into the air-conditioning case 12 through the drain pipe 128 flows toward the core portion 161 of the evaporator 16. In contrast, the vehicle air-conditioning unit 10 of the present embodiment is provided such that the suction air drawn into the air-conditioning case 12 through the drain pipe 128 flows toward a second header tank portion 163 located on a lower end of the core portion 161 of the evaporator 16. The second header tank portion 163 is included in a half part of the evaporator 16 close to a bottom surface 127 of the air-conditioning case 12. Specifically, the evaporator 16 is arranged such that a centerline of a drain pipe 128 intersects with the second header tank portion 163 located on the lower end of the core portion 161.

In a configuration such as the vehicle air-conditioning unit 10 of the first embodiment in which the suction air drawn into the air-conditioning case 12 through the drain pipe 128 flows toward the core portion 161 of the evaporator 16, the suction air drawn into the air-conditioning case 12 through the drain pipe 128 is pushed by the air flowing out of the core portion 161. Accordingly, in the vehicle air-conditioning unit 10 of the first embodiment, the effect of cooling the suction air drawn into the air-conditioning case 12 through the drain pipe 128 might decrease.

In contrast, in the vehicle air-conditioning unit 10 of the present embodiment, the evaporator 16 is arranged such that the center line of the drain pipe 128 intersects with the second header tank portion 163 located on the lower end of the core portion 161, and the suction air flows along the lower header tank portion 163. Accordingly, in the vehicle air-conditioning unit 10 of the present embodiment, the suction air is not pushed by the air flowing out of the core portion 161, and accordingly the capacity for cooling the suction air can be improved.

In the present embodiment, the effects derived from the configurations common to the above-described first embodiment can be obtained similarly to the first embodiment.

The present embodiment is based on the first embodiment, but the present embodiment can be combined with the above-described first or second embodiment.

Fourth Embodiment

Figure 6:
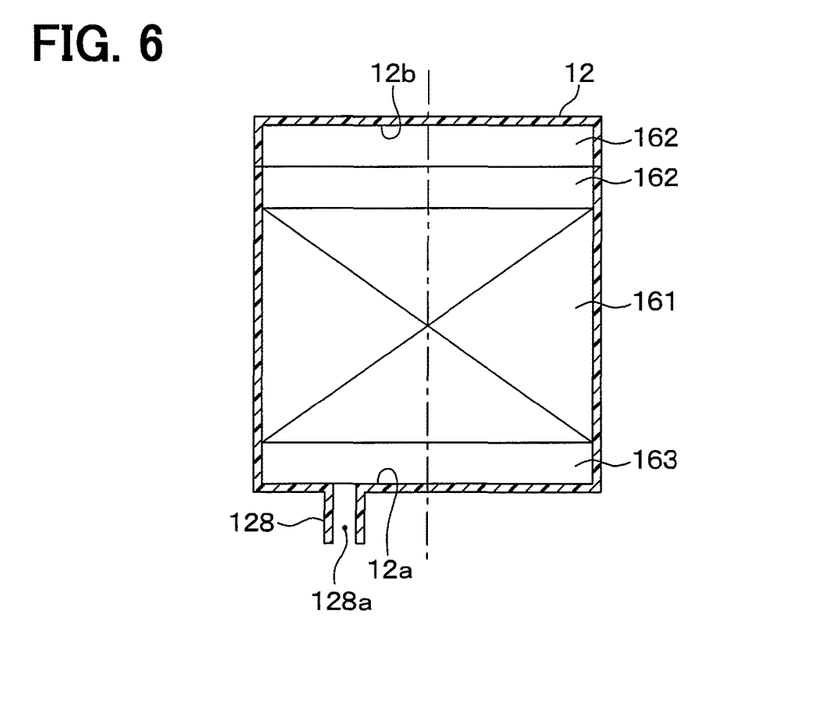
FIG. 6 is a diagram illustrating an air outflow surface side of a core portion of an evaporator of the vehicle air-conditioning unit according to the third embodiment of the present disclosure.

A vehicle air-conditioning unit 10 according to a fourth embodiment of the present disclosure will described referring to FIG. 6. In the vehicle air-conditioning unit 10 of the above-described first embodiment, the drain pipe 128 provided in the bottom surface 127 of the air-conditioning case 12 is located at the center in the left-right direction of the evaporator 16 when the evaporator 16 is viewed from the air outflow surface side of the core portion 161 of the evaporator 16. In contrast, in the vehicle air-conditioning unit 10 of the present embodiment, the drain pipe 128 is offset to a left side by a predetermined distance from the center in the left-right direction of the evaporator 16 when the evaporator 16 is viewed from the air outflow surface side of the core portion 161 of the evaporator 16. The left-right direction is a lengthwise direction of a lower end part of the evaporator 16, i.e. the left-right direction of the sheet of FIG. 6.

When the drain pipe 128 provided on the bottom surface 127 of the air-conditioning case 12 is located at the center in the left-right direction of the evaporator 16 when the evaporator 16 is viewed from the air outflow surface of the core portion 161 of the evaporator 16 as in the vehicle air-conditioning unit 10 of the first embodiment shown in FIG. 2, a velocity of the flow of the air flowing out of the core portion 161 is high. Accordingly, in the vehicle air-conditioning unit 10 of the first embodiment, the suction air drawn into the air-conditioning case 12 through the drain pipe 128 is pushed by the air flowing out of the core portion 161. It may be considered that the capacity for cooling the air drawn into the air-conditioning case 12 through the drain pipe 128 is decreased in the vehicle air-conditioning unit 10 of the first embodiment.

In contrast, in the vehicle air-conditioning unit 10 of the present embodiment, the drain pipe 128 is offset to the left side by the predetermined distance from the center in the left-right direction of the evaporator 16 when the evaporator 16 is viewed from the air outflow surface side of the core portion 161 of the evaporator 16. The left-right direction is a lengthwise direction of a lower end of the evaporator 16, i.e. the left-right direction of the sheet of FIG. 6.

That is, in the vehicle air-conditioning unit 10 of the present embodiment, when the lengthwise direction of the lower end part of the evaporator 16 is defined as the left-right direction, the drain pipe 128 is provided such that the extended line of the centerline of the drain pipe 128 intersects with a part of the evaporator 16 located separate by the predetermined distance from the center in the left-right direction.

At the part of the evaporator 16 located separate by the predetermined distance from the center in the left-right direction, the force of the air flowing out of the core portion 161 pushing the suction air is small compared to the center in the left-right direction of the evaporator 16. Accordingly, in the vehicle air-conditioning unit 10 of the present embodiment, the suction air drawn into the air-conditioning case 12 through the drain pipe 128 can be cooled more.

In the present embodiment, the effects derived from the configurations common to the above-described first embodiment can be obtained similarly to the first embodiment.

The present embodiment is based on the first embodiment, but the present embodiment can be combined with one of the above-described first to third embodiments.

Fifth Embodiment

Figure 7:
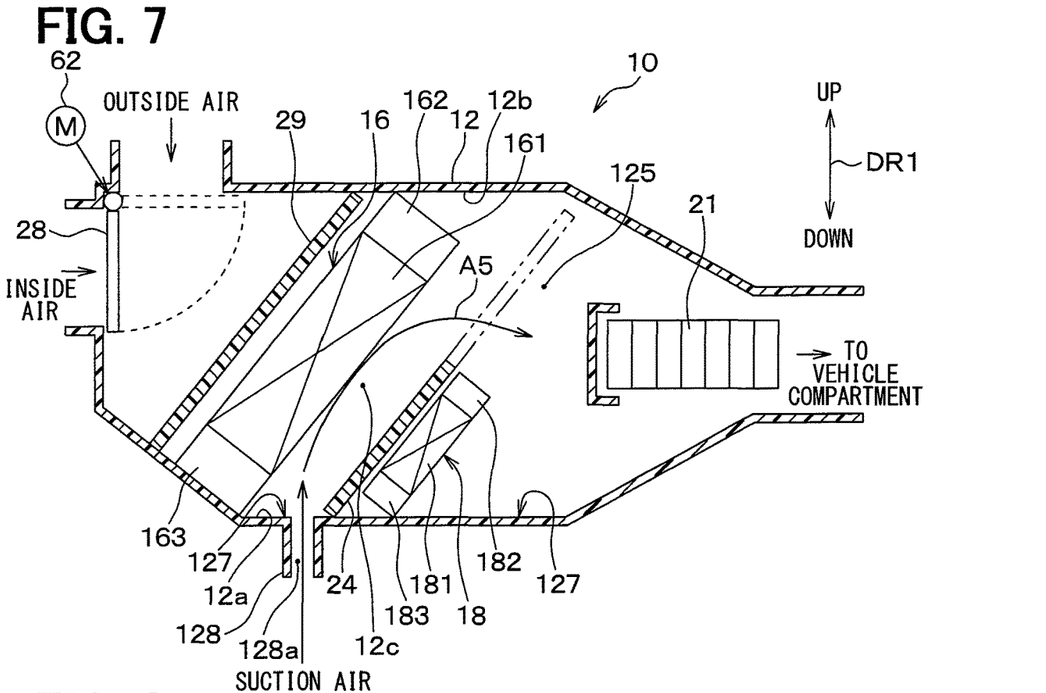
FIG. 7 is a diagram illustrating a main structure of a vehicle air-conditioning unit according to a fourth embodiment of the present disclosure.

A vehicle air-conditioning unit 10 according to a fifth embodiment of the present disclosure will be described referring to FIG. 7. The vehicle air-conditioning unit 10 of the present embodiment is different from the vehicle air-conditioning unit 10 of the above-described first embodiment in a point where the vehicle air-conditioning unit 10 includes an air-mix door 24 and a heater core 18.

The heater core 18 is a heating heat exchanger, i.e. a heater, that heats the air flowing out of the evaporator 16 with an engine coolant which is hot water. The heater core 18 is located downstream of the evaporator 16 with respect to the flow of the air in the air-conditioning case 12.

The structure of the heater core 18 is substantially the same as that of a known heating heat exchanger commonly used in a vehicle air conditioner. Specifically, the heater core 18 includes a core portion 181, and a first header tank portion 182 and a second header tank portion 183 which are respectively disposed at both ends of the core portion 181. The core portion 181 of the heater core 18 includes multiple hot-water tubes, each communicating with the header tank portions 182, 183 and having a flat cross-sectional shape, and multiple corrugated fins formed in a wave shape and disposed between the adjacent hot-water tubes. Furthermore, the core portion 181 has a structure in which the hot-water tubes and the corrugated fins are alternately stacked in the vehicle front-rear direction.

The heater core 18 exchanges heat between a high-temperature engine coolant flowing through the hot-water tubes and the air passing through the core portion 181, thereby the air is heated. The core portion 181 is partitioned into multiple fine air passages by the hot-water tubes and the corrugated fins, so that in the core portion 181, the air mainly flows along the thickness direction of the core portion 181. The heater core 18 is disposed such that the first header tank portion 182 is positioned upward of the second header tank portion 183. Thus, the first header tank portion 182 serves as an upper end of the heater core 18, while the second header tank portion 183 serves as a lower end of the heater core 18.

The heater core 18 is spaced apart from the evaporator 16 and disposed in the air-conditioning case 12 such that an air outflow surface from which the air passing through the core portion 181 flows out is disposed in parallel with an air outflow surface from which the air passing through the core portion 161 of the evaporator 16 flows out.

An air-mix door 24 is provided between the heater core 18 and the evaporator 16. The air-mix door 24 is a slide-type door and driven to slide by an electric actuator that is not shown.

The air-mix door 24 adjusts, in accordance with its position, a ratio of a flow rate of an air passing through the heater core 18 to a flow rate of an air passing through a bypass passage 125 located above the heater core 18 in the air-conditioning case 12.

A warm air passing through the core portion 181 of the heater core 18 and a cool air passing through the bypass passage 125 are mixed in a region located downstream of the heater core 18, and the mixed air is introduced into the vehicle compartment.

The vehicle air-conditioning unit 10 of the present embodiment includes the heater core 18 that is located downstream of the evaporator 16 with respect to the flow of the air to heat the air flowing out of the evaporator 16. The drain pipe 128 is provided between an end portion of the evaporator 16 close to the bottom surface 127 of the air-conditioning case 12 and an end portion of the heater core 18 close to the bottom surface 127 of the air-conditioning case 12. That is, the drain pipe 128 is located downstream of the evaporator 16 and upstream of the heater core 18 with respect to the flow of the air.

According to such configurations, the heater core 18 located downstream of the evaporator 16 to heat the air flowing out of the evaporator 16 is provided, and the drain pipe 128 is located downstream of the evaporator 16 and upstream of the heater core 18. Accordingly, the suction air drawn into the air-conditioning case 12 through the drain pipe 128 is pushed against the air outflow surface of the evaporator 16 and flows between the evaporator 16 and the heater core 18.

Accordingly, as compared to a case where the heater core 18 is not provided such as the above-described first to fourth embodiments, a capacity for cooling the suction air drawn into the air-conditioning case 12 through the drain pipe 128 can be improved.

In the present embodiment, the effects derived from the configuration common to the above-described first embodiment can be obtained similarly to the first embodiment.

The present embodiment is based on the first embodiment, but the present embodiment can be combined with any one of the above-described first to fourth embodiments.

Sixth Embodiment

A vehicle air-conditioning unit 10 according to a sixth embodiment of the present disclosure will be described referring to FIG. 8. In the vehicle air-conditioning unit 10 of the present embodiment, the number of air-mix door, and positions of the air-mix door and the heater core 18 are different from the vehicle air-conditioning unit 10 of the above-described fifth embodiment.

The vehicle air-conditioning unit 10 of the above-described fifth embodiment includes one air-mix door 24, but the vehicle air-conditioning unit 10 of the present embodiment includes a first air-mix door 24 and a second air-mix door 26.

The first air-mix door 24 is located between the evaporator 16 and a first heating portion 185 that is an upper part of the heater core 18. The first air-mix door 24 has a slide door mechanism and is adapted to slide by an electric actuator that is not shown.

The first air-mix door 24 adjusts, in accordance with its position, the ratio of a flow rate of an air passing through the first heating portion 185 to that of an air flowing through an upper bypass passage 125a through which the air flows above the heater core 18 in the air-conditioning case 12 to bypass the heater core 18.

The second air-mix door 26 is located between the evaporator 16 and a second heating portion 186 that is a lower part of the heater core 18. The second air-mix door 26 has a slide door mechanism similarly to the first air-mix door 24 and is adapted to slide by an electric actuator that is not shown.

The second air-mix door 26 adjusts, in accordance with its position, the ratio of a flow rate of an air passing through the second heating portion 186 to that of an air flowing through a lower bypass passage 125b through which the air flows below the heater core 18 in the air-conditioning case 12 to bypass the heater core 18.

The air-conditioning case 12 includes multiple air supply openings through which the air conditioned based on the positions of the first air-mix door 24 and the second air-mix door 26, and the conditioned air is blown into the vehicle compartment through one of the multiple air supply openings.

In the air-conditioning case 12 of the present embodiment, the upper bypass passage 125a through which the air flows above the heater core 18 to bypass the heater core 18, and the lower bypass passage 125b through which the air flows below the heater core 18 to bypass the heater core 18 are provided.

The vehicle air-conditioning unit 10 includes the heater core 18 that is located downstream of the evaporator 16 and heats the air flowing out of the evaporator 16, and the drain pipe 128 is located downstream of the evaporator 16 and upstream of the heater core 18. Specifically, the drain pipe 128 is provided between the end portion of the evaporator 16 close to the bottom surface 127 of the air-conditioning case 12 and the end portion of the heater core 18 close to the bottom surface 127 of the air-conditioning case 12.

Accordingly, the suction air drawn into the air-conditioning case 12 through the drain pipe 128 is separated to flow through the upper bypass passage 125a, through which the air flows above the heater core 18 to bypass the heater core 18 as indicated by an arrow A6 in FIG. 8, and through the lower bypass passage 125b, through which the air flows below the heater core 18 to bypass the heater core 18 as indicated by an arrow A7 in FIG. 8.

A part of the suction air drawn into the air-conditioning case 12 through the drain pipe 128 is pushed against an air inflow surface of the heater core 18 and flows between the evaporator 16 and the heater core 18 as indicated by an arrow A6 in FIG. 6.

Accordingly, as compared to a case where the heater core 18 is not provided such as the above-described first to fourth embodiments, a capacity for cooling the suction air drawn into the air-conditioning case 12 through the drain pipe 128 can be improved.

Figure 8:
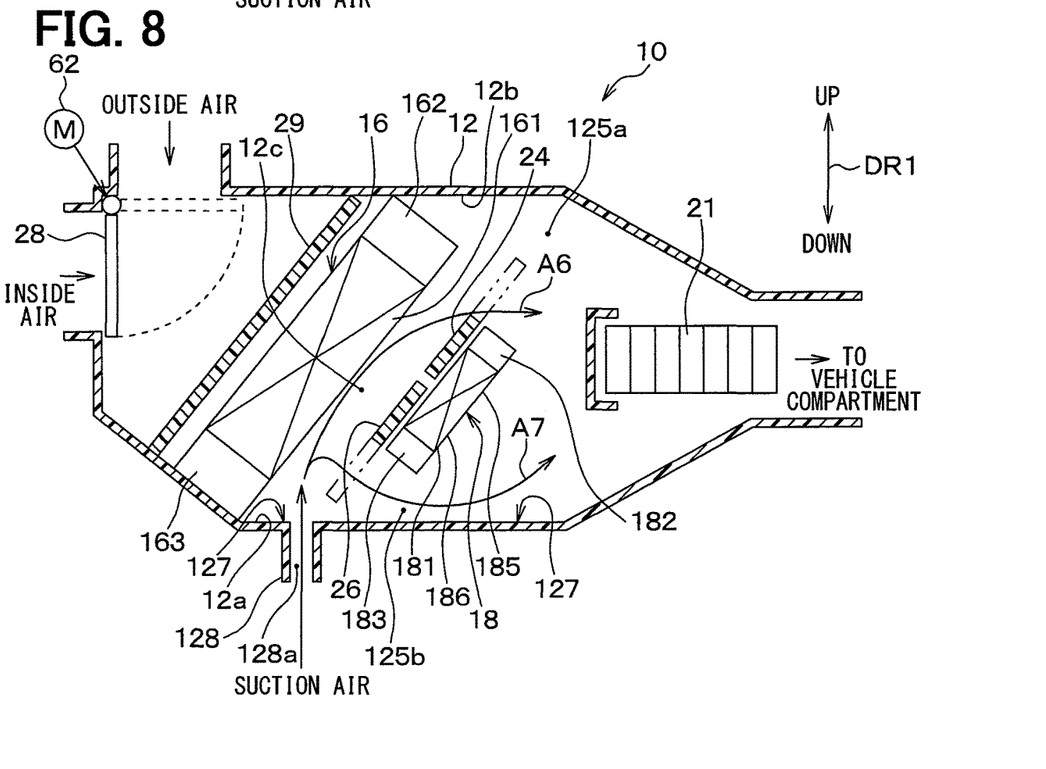
FIG. 8 is a diagram illustrating a main structure of a vehicle air-conditioning unit according to a fifth embodiment of the present disclosure.

Moreover, the rest part of the suction air drawn into the air-conditioning case 12 through the drain pipe 128 is cooled by a heat exchange with the evaporator 16 when the air flows along the evaporator 16 as indicated by the arrow A7 in FIG. 8. Subsequently, the rest part of the suction air is cooled by the heat exchange with the condensed water generated on the evaporator 16 when the air passes through the lower bypass passage 125b through which the air flows below the heater core 18 to bypass the heater core 18. Accordingly, the air flowing through the lower bypass passage 125b through which the air flows below the heater core 18 to bypass the heater core 18 is also cooled by the evaporator 16 and the condensed water generated on the evaporator 16, and the comfort of occupants can be improved.

In the present embodiment, the effects derived from the configuration common to the above-described first embodiment can be obtained similarly to the first embodiment.

The present embodiment is based on the first embodiment, but the present embodiment can be combined with any one of the above-described first to fifth embodiments.

Seventh Embodiment

Figure 9:
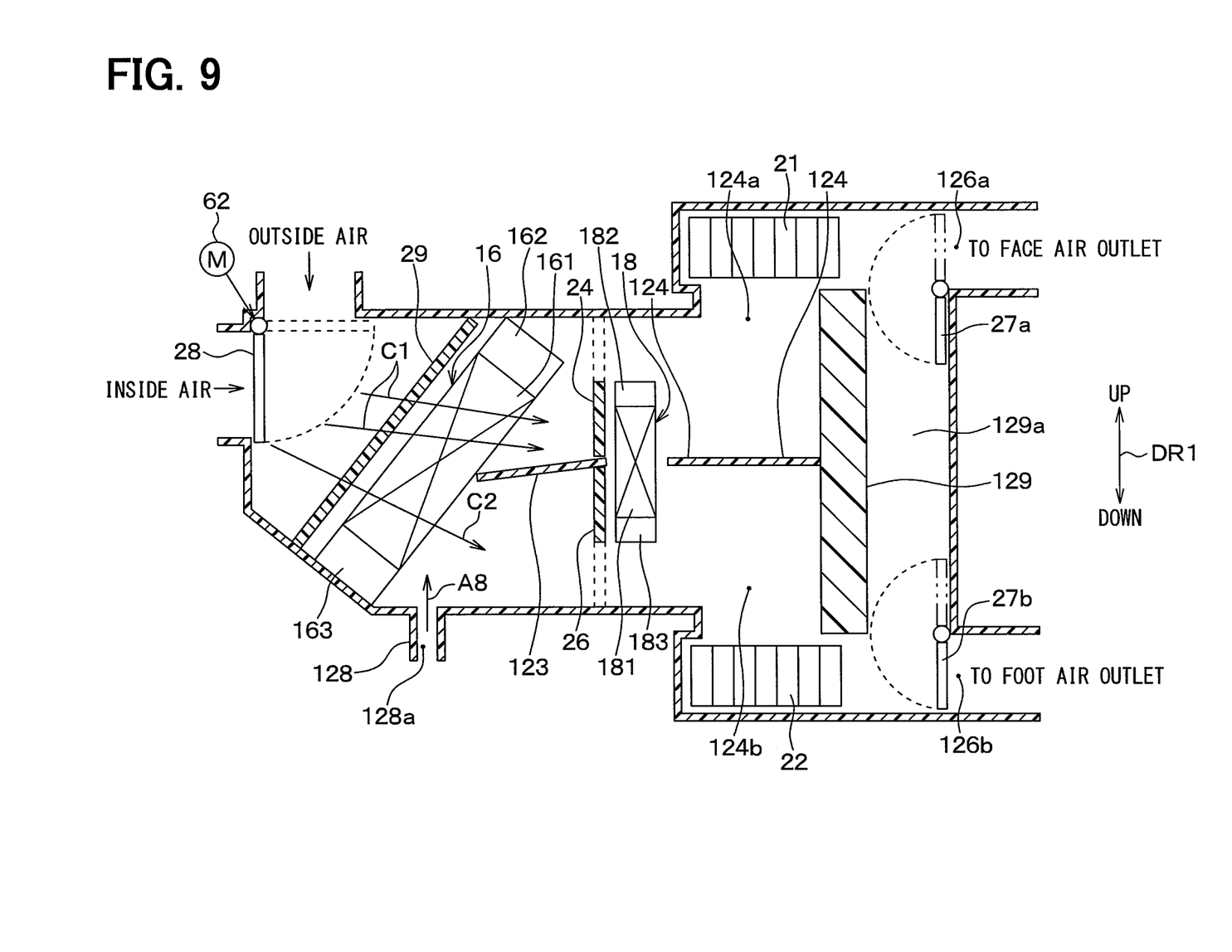
FIG. 9 is a diagram illustrating a main structure of a vehicle air-conditioning unit according to a sixth embodiment of the present disclosure.

A vehicle air-conditioning unit 10 according to a seventh embodiment of the present disclosure will be described referring to FIG. 9. The vehicle air-conditioning unit 10 of the present embodiment is different from the vehicle air-conditioning unit 10 of the above-described sixth embodiment in that the air-conditioning case 12 includes a first partition wall 123, a second partition wall 124, and a third partition wall 129, and two blowers 21, 22 are provided.

The first partition wall 123 and the second partition wall 124 serve as partition boards that partition an inside space of the air-conditioning case 12 into two segments in an up-down direction DR1 of a vehicle. The first partition wall 123 and the second partition wall 124 are arranged successively across a heater core 18 and located downstream of an evaporator 16. In detail, the first partition wall 123 is disposed between the evaporator 16 and the heater core 18 and partitions the inner space of the air-conditioning case 12. The second partition wall 124 is located downstream of the heater core 18 and partitions the inner space of the air-conditioning case 12 on a downstream side of the heater core 18. The air-conditioning case 12 includes an upper passage 124a located above the second partition wall 124 and a lower passage 124b located below the second partition wall 124.

In the air-conditioning case 12, a communication passage 129a through which the upper passage 124a located above the second partition wall 124 and the lower passage 124b located below the second partition wall 124 are communicated with each other. The communication passage 129a is defined by the third partition wall 129 provided in the air-conditioning case 12.

In the communication passage 129a, a communication passage door 27a and a foot air outlet door 27b are provided. The communication passage door 27a is rotated to open or close the communication passage 129a and a face communication passage 126a communicating with a face air outlet. The foot air outlet door 27b is rotated to open or close the communication passage 129a and a foot communication passage 126b communicating with a foot air outlet.

In a face mode operation, the communication passage door 27a is controlled to open the communication passage 129a and the face communication passage 126a, and the foot air outlet door 27b is controlled to open the communication passage 129a and close the foot communication passage 126b.

Accordingly, in the face mode operation, the air passing through the first passage 124a located above the second partition wall 124 is blown, by the blower 21, into the vehicle compartment from the face air outlet through the face communication passage 126a. On the other hand, the air passing through the second passage 124b located below the second partition wall 124 is blown, by the blower 22, into the vehicle compartment from the face air outlet through the communication passage 129a and the face communication passage 126a.

In a bilevel mode operation, the communication passage door 27a is controlled to open the communication passage 129a and the face communication passage 126a, and the foot air outlet door 27b is controlled to open the communication passage 129a and the foot communication passage 126b.

Accordingly, in the bilevel mode operation, the air or cool air passing through the first passage 124a located above the second partition wall 124 is blown, by the blower 21, into the vehicle compartment from the face air outlet through the face communication passage 126a. On the other hand, the air or warm air passing through the second passage 124b located below the second partition wall 124 is blown, by the blower 22, into the vehicle compartment from the foot air outlet through the foot communication passage 126b.

In the bilevel mode operation, since the cool air is blown into the vehicle compartment from the face air outlet and the warm air is blown into the vehicle compartment from the foot air outlet, occupants may feel comfortable by keeping the head cool and the feet warm.

In the above-described configurations, in the bilevel mode operation, the suction air drawn into the air-conditioning case 12 through the drain pipe 128 flows along the evaporator 16 to be cooled by heat exchange with the air flowing out of the evaporator 16. Subsequently, the suction air is blown into the vehicle compartment from the foot air outlet. The suction air drawn into the air-conditioning case 12 is cooled by the air flowing out of the evaporator 16 but is higher in temperature than the air flowing out of the evaporator 16. The air blown into the vehicle compartment from the foot air outlet is higher in temperature than the air blown into the vehicle compartment from the face air outlet. Accordingly, even when the temperature of the suction air is a little bit higher than the temperature of the air flowing out of the evaporator 16, occupants are unlikely to feel uncomfortable due to a decrease of cooling capacity by the suction air, a bad smell, smoke or the like.

In the face mode operation, the air or warm air flowing through the second passage 124b located below the second partition wall 124 flows through the communication passage 129a and reaches the face communication passage 126a communicating with the face air outlet. Since the air passing through the second passage 124b flows through the communication passage 129a, a pressure loss of the air passing through the second passage 124b located below the second partition wall 124 is larger than that of the air passing through the first passage 124a located above the second partition wall 124. Accordingly, the amount of the air flowing, as indicated by an arrow C2 in FIG. 9, into the second passage 124b located in a lower part is smaller than that of the air flowing, as indicated by an arrow C1 in FIG. 9, into the first passage 124a located in an upper part. Moreover, the suction air drawn into the air-conditioning case 12 through the drain hole 128a of the drain pipe 128 easily reaches the air outflow surface of the evaporator 16. Accordingly, the suction air can be cooled more.

In the present embodiment, the effects derived from the configuration common to the above-described first embodiment can be obtained similarly to the first embodiment.

The present embodiment is based on the first embodiment, but the present embodiment can be combined with any one of the above-described first to sixth embodiments.

Other Embodiments (1) In the above-described embodiments, the evaporator 16 is provided such that the extended line of the centerline C0 of the drain pipe 128 intersects with the half part 16a of the evaporator 16 close to the bottom surface 127 of the air-conditioning case 12. In the above-described embodiments, the evaporator may be arranged such that the extended line of the centerline 128 of the drain pipe 128 intersects with an upper half part of the evaporator 16.

(2) In the vehicle air-conditioning unit 10 of the above-described fourth embodiment, the drain pipe 128 is offset to the left side by the predetermined distance from the center in the left-right direction of the evaporator 16 when the evaporator 16 is viewed from the air outflow surface side of the core portion 161 of the evaporator 16. The drain pipe 128 of the above-described fourth embodiment may be offset to a right side by the predetermined distance from the center in the left-right direction of the evaporator 16.

(3) In the above-described seventh embodiment, the face communication passage 126a is provided in the air-conditioning case 12, and the face air outlet communicates with the face communication passage 126a. The face communication passage 126a of the above-described seventh embodiment may communicate with the face air outlet and a defogger air outlet.

The present disclosure is not limited to the above-described embodiments. In the above-described embodiments, it is needless to say that elements constituting the embodiments are not essential except for a case of being explicitly specified to be essential and a case of being considered to be absolutely essential in principle. Even when a factor such as a quantity of elements, a value, an amount, a range is mentioned in the above-described embodiments, it is to be understood that the factor is not limited to a specific value except for a case of being explicitly specified to be necessary and a case of being considered to be absolutely necessary in principle. Even when a feature such as a material forming a member, a shape of a member, a positional relation of members are described in the above-described embodiments, it is to be understood that such feature is not limited to a specific material, shape, positional relation, or the like except for a case of being explicitly specified to be necessary and a case of being considered to be absolutely necessary in principle.

What is claimed is:

1. A vehicle air-conditioning unit for a vehicle, the vehicle air-conditioning unit comprising:
   an air-conditioning case;
   an inside/outside air switching door that is configured to change a ratio of a flow rate of an inside air to a flow rate of an outside air in an air introduced into the air-conditioning case;
   a cooler that is disposed in the air-conditioning case and cools the air introduced into the air-conditioning case, the cooler having (i) an air inflow surface through which the air flows into the cooler and (ii) an air outflow surface through which the air flows out of the cooler; and
   a blower that is located downstream of the cooler with respect to a flow of the air introduced into the air-conditioning case and sends the air introduced into the air-conditioning case to a vehicle compartment, wherein
   the air-conditioning case includes a drain pipe located downstream of the cooler with respect to the flow of the air introduced into the air-conditioning case, the drain pipe having a tube shape through which a condensed water generated on the cooler is drained out of the air-conditioning case,
   the cooler is arranged such that the air outflow surface intersects with an extended line of a centerline of the drain pipe and a suction air drawn through the drain pipe into the air-conditioning case flows along the cooler, and
   the suction air drawn into the air-conditioning case through the drain pipe contacts the air outflow surface of the cooler.

2. The vehicle air-conditioning unit according to claim 1, wherein
   the air-conditioning case includes
      one side that is a part of an inner part of the air-conditioning case, the drain pipe being provided on the one side, and
      another side that is a part of the inner part of the air-conditioning case, the cooler being between the one side and the other side,
   the air-conditioning case defines an air flow space through which the suction air drawn through the drain pipe into the air-conditioning case flows from the one side to the other side along the cooler.

3. The vehicle air-conditioning unit according to claim 1, wherein
   the cooler is arranged such that the extended line of the centerline of the drain pipe intersects with a half part of the cooler close to a bottom surface of the air-conditioning case.

4. The vehicle air-conditioning unit according to claim 1, wherein
   the cooler is angled to have an upper end part located downstream of a lower end part with respect to the air flowing through the cooler.

5. The vehicle air-conditioning unit according to claim 1, wherein
   the drain pipe is angled with respect to a bottom surface of the air-conditioning case.

6. The vehicle air-conditioning unit according to claim 1, wherein
   the cooler includes
      a core portion that cools the air introduced into the air-conditioning case by heat exchange, and
      a lower header tank portion that is located at a lower end of the core portion, and
   the cooler is arranged such that the suction air flows along the lower header tank portion.

7. The vehicle air-conditioning unit according to claim 1, wherein
   a left-right direction of the cooler is a lengthwise direction of a lower end part of the cooler, and
   the drain pipe is provided such that the extended line of the centerline of the drain pipe intersects with a part of the cooler located separate from a center in the left-right direction.

8. The vehicle air-conditioning unit according to claim 1, wherein
   a left-right direction of the cooler is a lengthwise direction of a lower end part of the cooler, and
   the drain pipe is offset from a center of the cooler in the left-right direction by a predetermined distance to a right side or a left side when the cooler is viewed from the air outflow surface of the cooler.

9. The vehicle air-conditioning unit according to claim 1, further comprising
   a heater that is located downstream of the cooler with respect to the flow of the air introduced into the air-conditioning case and heats the air introduced into the air-conditioning case flowing out of the cooler, wherein the drain pipe is provided between an end part of the cooler close to a bottom surface of the air-conditioning case and an end part of the heater close to the bottom surface of the air-conditioning case.

10. The vehicle air-conditioning unit according to claim 9, wherein the air-conditioning case includes
  an upper bypass passage that is located above the heater to bypass the heater, and
  a lower bypass passage that is located below the heater to bypass the heater.

11. The vehicle air-conditioning unit according to claim 7, wherein the air-conditioning case includes
  a first partition wall that is located between the cooler and the heater and partitions the air-conditioning case into an upper part and a lower part,
  a second partition wall that is located downstream of the heater and partitions the air-conditioning case into the upper part and the lower part, and
  a third partition wall that defines a communication passage through which an upper passage communicates with a lower passage, the upper passage being located above the second partition wall and communicating with a face air outlet, the lower passage communicating with a foot air outlet, the blower is provided in each of the upper passage and the lower passage, in a face mode operation, the air introduced into the air-conditioning case flowing through the lower passage reaches the face air outlet through the communication passage by the blower, and in a bilevel mode operation, the air introduced into the air-conditioning case flowing through the lower passage reaches the foot air outlet by the blower.

12. The vehicle air-conditioning unit according to claim 1, wherein the suction air is drawn upward into the air-conditioning case through the drain pipe contacting the air outflow surface of the cooler.

* * * * *